Figure 1:
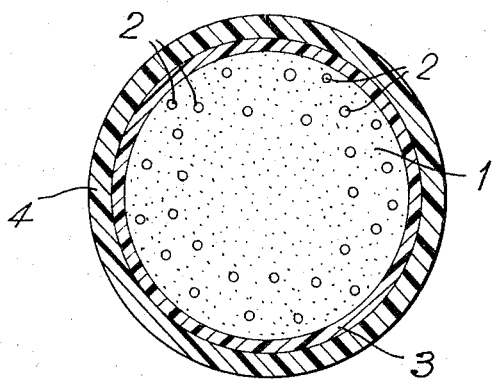

INVENTOR
*IRVING FEUER*
BY
*Blum, Moscovitz, Friedman, Blum & Kaplan*
ATTORNEYS

United States Patent Office 3,366,573
Patented Jan. 30, 1968

3,366,573
COATED PHOSPHOR HAVING RADIOISOTOPE DISPERSED THEREIN AND METHOD OF PREPARATION
Irving Feuer, Port Washington, N.Y., assignor to Canrad Precision Industries, Inc., New York, N.Y., a corporation of New York
Filed Oct. 24, 1965, Ser. No. 504,812
9 Claims. (Cl. 252—301.1)

This invention relates to radioactivated phosphors, and more particularly to phosphors which have been radioactivated with radium salts or the like to provide a light emitting phosphor.

According to the classical method of radioactivation of phosphors such as of zinc sulphide and the like, a radium salt such as radium chloride is deposited on the phosphor by evaporation of a solution of the radium salt, after which the radium chloride is converted to an insoluble sulphate on the surface of the phosphor. The phosphor is then dried, and mixed with an appropriate binder—thinner combination (such binders include ethyl cellulose, vinyl adhesives, etc.), and used as a radio-luminescent paint.

One of the disadvantages of radioactivated phosphors of the above-described known type is the lack of safety thereof due to relatively high radioactive hazard. Consequently, attempts were made to reduce this hazard by providing other products and methods of producing the same. For example, according to one method glass microspheres having a radioactive isotope lodged therein have been prepared, and these radioactivated microspheres then mechanically mixed with phosphors, and the resulting combination used to provide a radio-luminescent paint. While this results in reduction in the dangers of excess radioactive emission, the disadvantage of this product is that the light output efficiency is considerably lowered because the glass microsphere absorbs a large fraction of the energy of the radioisotope particle embedded therein.

It is accordingly a primary object of the present invention to provide a radioactivated phosphor product which exhibits a high degree of safety from the radiological viewpoint, but which nevertheless provides extremely high light producing efficiency.

It is another object of the present invention to provide a product and method of producing the same which combines the efficiency of the direct radioactivation of the phosphor with the safe of inclusion of the radioisotope in a microsphere.

It is still another object of my invention to provide for the closest possible contact between the activating radioisotope and the phosphor, while simultaneously reducing the potential escape of the radioisotope.

As yet another object, my invention provides for the reduction of the solubility of the radioisotope in fluids while still retaining the closest physical contact thereof with the light emitting phosphor.

Other object and advantages of the present invention will be apparent from a further reading of the specification and of the appended claims.

With the above and other objects in view, the present invention mainly comprises a body of light emitting phosphor having embedding therein particles of a radioisotope, and being covered with a transparent protective coating.

The radioisotope is embedded in the phosphor by thermal diffusion thereof into the body of the phosphor.

The transparent protective coating about the phosphor is preferably a coating of a transparent resin or vitreous forming material such as sodium silicate or potassium silicate, which is vitrified around the phosphor which has the radioisotope embedded therein by thermal diffusion. The protective layer can, of course, also be a silicone.

According to a further embodiment of the present invention, the entire body of the phosphor having the radioisotope embedded therein by thermal diffusion after liquid evaporation and being coated with the vitrified layer is further coated with an adhesive resin (different from the resin of the vitrified layer), such as an acrylic resin, an epoxy-alkyd resin, or the like.

This further coating permits the use of the product as a protected radioactive paint.

The invention is illustrated by way of example in the accompanying drawing, in which there is shown in FIG. 1 a phosphor 1, for example of zinc sulphide, with particles of a radioisotope 2, for example Pm–147 embedded therein by being thermally diffused inwardly after initial surface deposition by evaporation from an aqueous or other medium. The phosphor 1 is coated by a thin protective transparent coating 3 of, for example, sodium silicate or a silicone resin. The whole is then mixed with and therefore covered by a resin adhesive 4 of, for example, acrylic resin, to form the complete protected radioactive paint.

Figure 2:
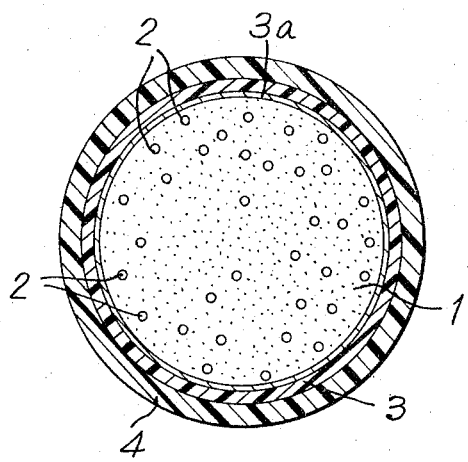

According to another embodiment of the invention, as illustrated in FIG. 2, the phosphor 1 having the radioisotope particles 2 embedded therein is protectively coated by an inert carrier layer 3a which may, for example, be the non-radioactive isotope of the thermally diffused raidoisotope 2 which is embedded in the phosphor 1.

Thus, for example, if Pm–147 is used as the radio active beta emitter which is diffused into the phosphor 1 of, for example, zinc sulphide, then the phosphor may be coated with a different member of the lanthanide series such as Nd or samarium compound and converted to a similar type compound like the radioisotope: e.g. samarium oxide neodgmium oxide which is not radioactive. This protective layer 3a may be applied by means of a carrier such as inert samarium or neodgmium salts which are diffused onto the surface after the impregnation with the radioactive substance. This inert layer of similar or identical but non-radioactive material serves as an extra blocking and therefore protective layer.

The subsequent protective layer 3 of, for example potassium or sodium silicate, which can be applied, for example, by evaporation and heat treatment is then applied to the phosphor particles to protect against undesired loss of the radioactive material. As indicated above, instead of potassium or sodium silicate, it is possible to use an epoxy resin, an alkyd resin, an acrylic resin or the like, which will not be attacked by the solvents of the final resin paint.

All of the particles, after the protective layer has been applied, are still free flowing and can then be mixed with conventional paint binders. However, the resultant matrix is less hazardous than the classical radium luminous compounds, and more efficient than the microsphere type of phosphors.

In producing the products of this invention, a phosphor is selected upon which a radioactive material may be deposited in some manner, for example by liquid evaporation, aerosol deposition, gaseous adsorption, etc. Among the suitable phosphors are zinc sulphide, cadmium sulphide, zinc silicate, calcium tungstate, etc.

A radioactive material, such as—

| Isotope | Chemical form |
|---|---|
| (1) Promethium-147 | ($PmCl_3$) |
| (2) Strontium-90 | ($SrBr_2$) |
| (3) Calcium-45 | ($CaCl_2$) |
| (4) Praesodymium-143 | | is then deposited on the phosphor. The phosphor plus the radioactive material is then heated at a temperature below the temperature which would cause significant modification of the phosphor, but sufficiently high and for a sufficient time interval to cause thermal diffusion or migration of the radioactive solid into the phosphor solid. This occurs due to a concentration gradient.

After diffusion of the radioisotope into the phosphor, a protective layer of, for example, potassium silicate or sodium silicate, or of a transparent resin is applied thereto. As indicated, according to the preferred embodiment of my invention, before the application of this protective layer, an inert blocking layer of, for example, the inert non-radioactive component of the radioisotope, is deposited on the phosphor.

The resulting product may then be dispersed in an adhesive paint, the adhesive of which provides a further protective layer.

The following specific example is given to more fully illustrate the invention. The scope of the invention is not, however, meant to be limited to the specific details of the example.

A zinc sulphide phosphor is suspended in an aqueous solution of $PmCl_3$. Dilute ammonium hydroxide is then added to precipitate $Pm(OH)_3$, which is converted to $Pm_2O_3$ by heating at 125° C. The material is then heated to a higher temperature to thermally diffuse the $Pm_2O_3$ or $PmCl_3$ into the zinc sulphide phosphor. In this example, the temperature of the heating is 900° C. This second heating temperature actually depends upon which phosphor is employed. The temperature which is used may be up to the crystallization temperature of the phosphor, after which the phosphor is re-crystallized, although in practice it is desirable to choose a temperature for the diffusion below that at which any significant transformation of the phosphor occurs, i.e., in the case of zinc sulphide below 1020° C.

According to an alternative method, the $PmCl_3$ can be thermally diffused into the phosphor without conversion thereof to the oxide.

The phosphor into which the Pm-147 has been deposited and diffused inwardly is then coated with a thin silicate layer of commercial Kasil #1 (potassium silicate) or Kasil #3 (sodium silicate) by standard methods and heat treated to form a dry luminescent protected powder. This powder is then mixed with resins, adhesives, etc. to form the complete protected radioactive paint.

While the invention has been described with respect to particular phosphors and radioisotopes, and the methods of producing radioactivated phosphors therewith, it is to be understood that many modifications and variations may be made without, however, departing from the spirit and scope of the invention. Accordingly, such modifications and variations are meant to be comprehended within the scope of the appended claims.

What is claimed as new and desired to be secured by Letters Patent is:

1. A radioactivated phosphor, comprising a body of inorganic light emitting phosphor having embedded and distributed therein particles of a radioactive isotope, and being coated with a non-radioactive transparent layer.

2. A radioactivated phosphor, comprising particles of a radioactive isotope thermally diffused into a body of inorganic light emitting phosphor, a coating of an inert non-radioactive component of said radioactive isotope on said phosphor forming a blocking layer thereon, and a coating of a transparent vitreous material on said blocking layer.

3. An adhesive paint having the radioactivated phosphor of claim 1 distributed therethrough.

4. An adhesive paint having the radioactivated phosphor of claim 3 distributed therethrough.

5. Method of producing radioactivated phosphors, which comprises depositing a radioactive isotope on an inorganic phosphor, heating the thus obtained material at a temperature sufficiently high to cause thermal diffusion of said radioactive isotope into said phosphor, and thereafter coating said radioactive phosphor with a non-radioactive transparent layer.

6. Method according to claim 5 in which the temperature of the heating is below the temperature at which said phosphor changes condition.

7. Method according to claim 5 in which said phosphor is zinc sulphide and in which the temperature is below about 1020° C.

8. Method according to claim 5 in which the phosphor coating is a silicate layer.

9. Method according to claim 5 in which an inert non-radioactive isotope of said radioactive isotope is deposited on the surface of the resulting phosphor, and wherein said phosphor having said coating deposited thereon is then further coated with a thin silicate layer.

References Cited

UNITED STATES PATENTS

| | | | |
|---|---|---|---|
| 1,097,979 | 5/1914 | Karr | 252—301.1 |
| 1,097,981 | 5/1914 | Krapf | 252—301.1 |
| 1,202,625 | 10/1916 | Viol | 252—301.1 |
| 1,275,890 | 8/1918 | Flannery et al. | 252—301.1 XR |
| 3,033,797 | 5/1962 | De Leo et al. | 252—301.1 |
| 3,084,062 | 4/1963 | Chleck et al. | 252—301.1 |
| 3,224,978 | 12/1965 | MacHutchin et al. | 252—301.1 |
| 3,238,139 | 3/1966 | Fischer et al. | 252—301.1 |

OTHER REFERENCES

C & E News, Jan. 2, 1961, p. 56.

CARL D. QUARFORTH, *Primary Examiner.*

BENJAMIN R. PADGETT, *Examiner.*

S. J. LECHERT, JR., *Assistant Examiner.*